(12) United States Patent
Kain

(10) Patent No.: US 12,632,212 B2
(45) Date of Patent: May 19, 2026

(54) USER INTERFACE FOR SELECTIVE FILTERING OF SPEECH AND NOISE

(71) Applicant: SKYWORKS SOLUTIONS, INC., Irvine, CA (US)

(72) Inventor: Alexander Kain, Portland, OR (US)

(73) Assignee: Skyworks Solutions, Inc., Irvine, CA (US)

( * ) Notice: Subject to any disclaimer, the term of this patent is extended or adjusted under 35 U.S.C. 154(b) by 655 days.

(21) Appl. No.: 18/090,975

(22) Filed: Dec. 29, 2022

(65) Prior Publication Data

US 2023/0214173 A1     Jul. 6, 2023

Related U.S. Application Data

(60) Provisional application No. 63/294,799, filed on Dec. 29, 2021.

(51) Int. Cl.
| | |
|---|---|
| *G06F 3/16* | (2006.01) |
| *G06F 3/04847* | (2022.01) |
| *G10L 21/0208* | (2013.01) |
| *H04R 1/10* | (2026.01) |

(52) U.S. Cl.
CPC .......... *G06F 3/165* (2013.01); *G06F 3/04847* (2013.01); *G10L 21/0208* (2013.01); *H04R 1/1041* (2013.01); *H04R 2420/07* (2013.01)

(58) Field of Classification Search
CPC .............. H04R 1/1041; H04R 2420/07; G10L 21/0208; G06F 3/04837; G06F 3/165
See application file for complete search history.

(56) References Cited

U.S. PATENT DOCUMENTS

| | | | | |
|---|---|---|---|---|
| 8,531,602 B1 * | 9/2013 | Tudor | .................... | G11B 27/28 |
| | | | | 348/485 |
| 11,676,568 B2 * | 6/2023 | Hamalainen | ..... | G10K 11/17857 |
| | | | | 381/71.6 |
| 2008/0165976 A1 * | 7/2008 | Albert | .................... | H04S 1/002 |
| | | | | 381/18 |
| 2010/0111337 A1 * | 5/2010 | Silber | ...................... | H04R 5/04 |
| | | | | 381/109 |
| 2013/0308800 A1 * | 11/2013 | Bacon | ...................... | H04R 3/12 |
| | | | | 381/300 |
| 2017/0142511 A1 * | 5/2017 | Dennis | ................ | H04R 1/1041 |

(Continued)

*Primary Examiner* — Oyesola C Ojo
(74) *Attorney, Agent, or Firm* — Chang & Hale LLP

(57)     ABSTRACT

An audio system can be controlled by a method that includes obtaining a mixture value from a user, where the mixture value has a value in a range from a first value for a first state to a second value for a second state, with the first state corresponding to a desired sound having substantially all of a first content and substantially nil amount of a second content, the second state corresponding to a desired sound having substantially nil amount of the first content and substantially all of the second content, and the mixture value being a selected one among multiple values in the range. The multiple values include an unprocessed mixture value for an unprocessed state corresponding to a desired sound having unprocessed first and second contents. The method can further include generating a control output signal based on the selected mixture value, and processing an audio signal based on the control output signal to generate a sound having the first content and/or the second content according to the selected mixture value.

17 Claims, 4 Drawing Sheets

(56)  References Cited

U.S. PATENT DOCUMENTS

| | | | |
|---|---|---|---|
| 2017/0251306 A1* | 8/2017 | Lindahl | H04R 5/04 |
| 2019/0164560 A1* | 5/2019 | Lee | H04H 20/95 |
| 2020/0236456 A1* | 7/2020 | Gallo | H04R 1/1008 |
| 2020/0396549 A1* | 12/2020 | Jespersgaard | H04R 25/505 |
| 2021/0014591 A1* | 1/2021 | Kim | H04R 1/028 |
| 2023/0300532 A1* | 9/2023 | Spittle | G06F 3/165 |
| | | | 381/1 |
| 2024/0155289 A1* | 5/2024 | Shuang | G10L 21/0364 |

* cited by examiner

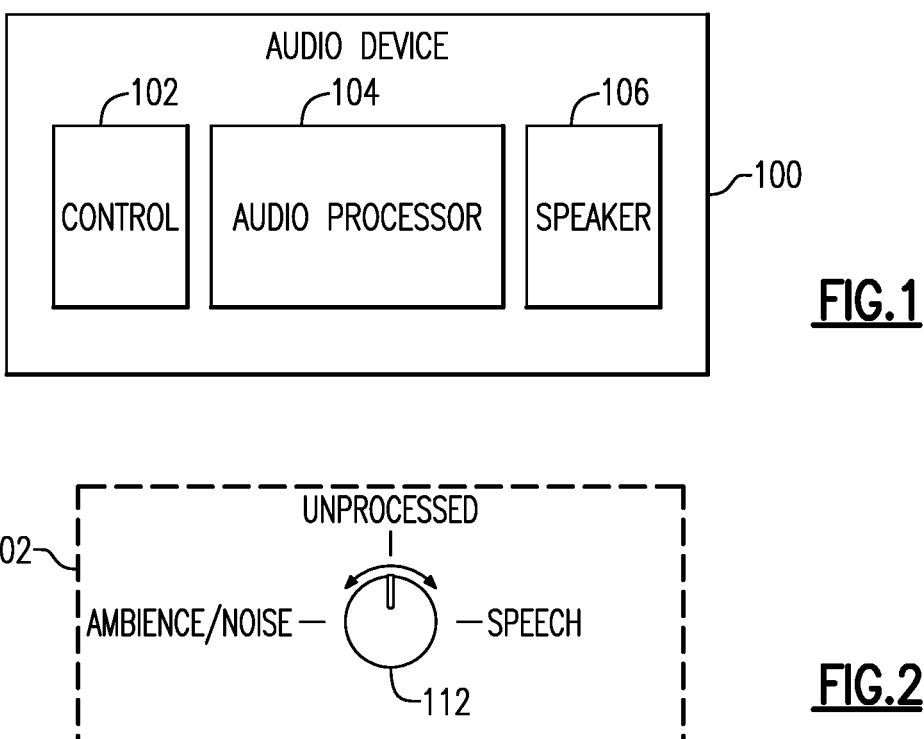
FIG.1
FIG.2
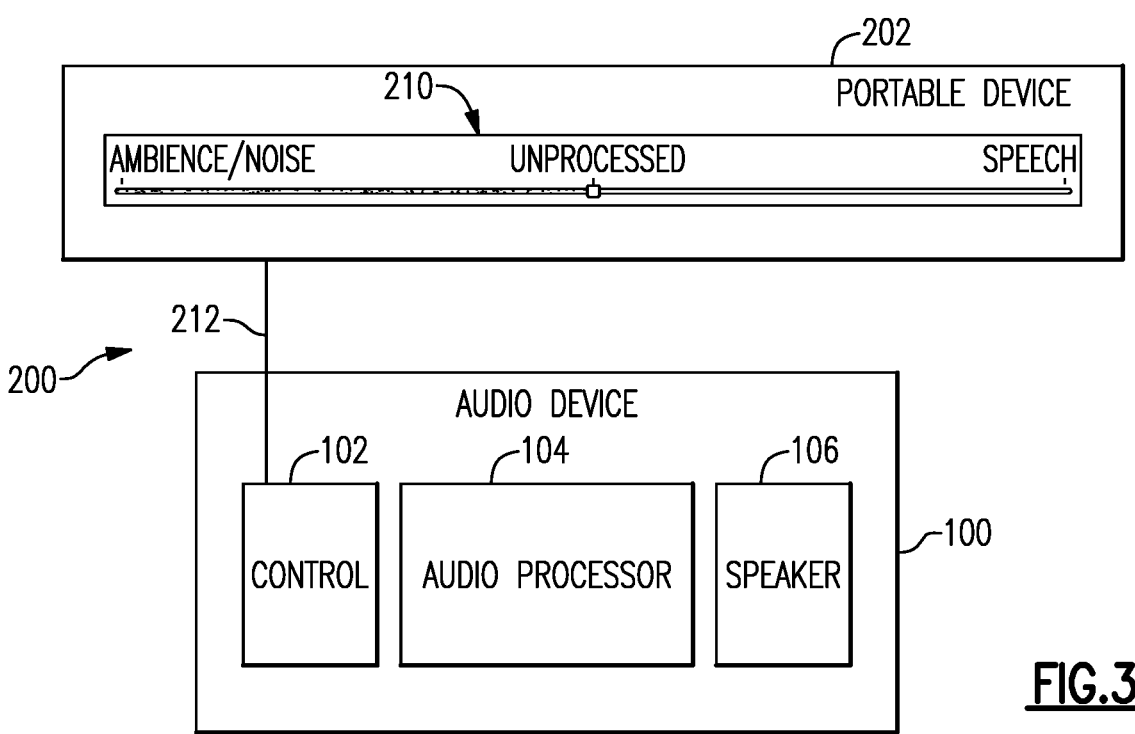
FIG.3

USER INTERFACE FOR SELECTIVE FILTERING OF SPEECH AND NOISE

CROSS-REFERENCE TO RELATED APPLICATION(S)

This application claims priority to U.S. Provisional Application No. 63/294,799 filed Dec. 29, 2021, entitled USER INTERFACE FOR SELECTIVE FILTERING OF SPEECH AND NOISE, the disclosure of which is hereby expressly incorporated by reference herein in its respective entirety.

BACKGROUND

Field

The present disclosure relates to user interface for selective filtering of speech and noise in audio applications.

Description of the Related Art

In some applications, an audio device can be configured to suppress noise in an audio output being provided to a user. Such suppression of noise can be achieved during processing of a signal that results in the audio output.

SUMMARY

In accordance with some implementations, the present disclosure relates to a method for controlling an audio system. The method includes obtaining a mixture value from a user, with the mixture value having a value in a range from a first value for a first state to a second value for a second state. The first state corresponds to a desired sound having substantially all of a first content and substantially nil amount of a second content, the second state corresponds to a desired sound having substantially nil amount of the first content and substantially all of the second content, and the mixture value is a selected one among multiple values in the range. The multiple values include an unprocessed mixture value for an unprocessed state corresponding to a desired sound having unprocessed first and second contents. The method further includes generating a control output signal based on the selected mixture value, and processing an audio signal based on the control output signal to generate a sound having the first content and/or the second content according to the selected mixture value.

In some embodiments, the first content can include an ambient noise content, and the second content can include a speech content.

In some embodiments, the range can be selected such that the first value is $-M_{limit}$ and the second value is $+M_{limit}$. The control output signal can be represented as Output=$(M_{limit}-$abs(mix))*unprocessed+abs(mix)*processed, where processed=$f$(unprocessed) with $f$ representing a sound suppression function and mix representing the selected mixture value. The sound suppression function can include an artificial intelligence sound suppression function. The quantity $M_{limit}$ it can have a value of 1, such that the control output signal is represented as Output=(1−abs(mix))*unprocessed+abs(mix)*processed, where processed=$f$(unprocessed).

In some embodiments, the range can be selected such that the unprocessed mixture value is approximately at middle of the range.

In some embodiments, the obtaining of the mixture value can include obtaining an input through a device that generates the sound. The sound-generating device can be, for example, a headphone.

In some embodiments, the obtaining of the mixture value can include obtaining an input through a portable device in communication with a device that generates the sound. The communication between the portable device and the sound-generating device can include a wireless communication. The portable device can be, for example, a smartphone and the sound-generating device can be, for example, a headphone.

In some embodiments, the obtaining of the input through the portable device can include providing a graphic user interface that allows the user to select the mixture value.

In some embodiments, the multiple values in the range can be discrete values. In some embodiments, the multiple values in the range can be parts of continuous or approximately continuous values in the range.

In some implementations, the present disclosure relates to an audio device that includes a speaker for providing an output sound to a user, and an audio processor configured to generate the output sound based on an audio signal. The audio device further includes a controller configured to obtain a mixture value in a range from a first value for a first state to a second value for a second state, with the first state corresponding to a desired sound having substantially all of a first content and substantially nil amount of a second content, the second state corresponding to a desired sound having substantially nil amount of the first content and substantially all of the second content, and the mixture value being a selected one among multiple values in the range. The multiple values include an unprocessed mixture value for an unprocessed state corresponding to a desired sound having unprocessed first and second contents. The controller is further configured to generate a control output signal based on the selected mixture value, such that the audio processor processes the audio signal based on the control output signal to generate the output sound with the first content and/or the second content according to the selected mixture value.

In some embodiments, the first content can include an ambient noise content, and the second content can include a speech content.

In some embodiments, the range can be selected such that the first value is $-M_{limit}$ and the second value is $+M_{limit}$. The control output signal can be represented as Output=$(M_{limit}-$abs(mix))*unprocessed+abs(mix)*processed, where processed=$f$(unprocessed) with $f$ representing a sound suppression function and mix representing the selected mixture value. The sound suppression function can include an artificial intelligence sound suppression function, and the quantity $M_{limit}$ can have a value of 1, such that the control output signal is represented as Output=(1−abs(mix))*unprocessed+abs(mix)*processed, where processed=$f$(unprocessed).

In some embodiments, the range can be selected such that the unprocessed mixture value is approximately at middle of the range.

In some embodiments, the audio device can further include an input interface configured to allow the user to select the mixture value. In some embodiments, the audio device can be a headphone.

In some embodiments, the controller can be configured to obtain the mixture value from a separate portable device. In some embodiments, the portable device can be a smartphone and the audio device can be a headphone.

In some embodiments, the multiple values in the range can be discrete values. In some embodiments, the multiple values in the range can be parts of continuous or approximately continuous values in the range.

In some implementations, the present disclosure relates to a system that includes an audio device including a speaker for providing an output sound to a user, an audio processor configured to generate the output sound based on an audio signal, and a controller configured to obtain a mixture value in a range from a first value for a first state to a second value for a second state. The first state corresponds to a desired sound having substantially all of a first content and substantially nil amount of a second content, the second state corresponds to a desired sound having substantially nil amount of the first content and substantially all of the second content, and the mixture value is a selected one among multiple values in the range. The multiple values include an unprocessed mixture value for an unprocessed state corresponding to a desired sound having unprocessed first and second contents. The controller is further configured to generate a control output signal based on the selected mixture value, such that the audio processor processes the audio signal based on the control output signal to generate the output sound with the first content and/or the second content according to the selected mixture value. The system further includes a portable device configured to communicate with the audio device. The portable device includes an application that allows the user to select the mixture value.

In some embodiments, the portable device can be a smartphone and the audio device can be a headphone.

In some embodiments, the application on the portable device can include a graphic user interface having a display configured to allow the user to select the mixture value.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 1 depicts a block diagram of an audio device having a control component, an audio processor component and a speaker component.

FIG. 2 shows that in some embodiments, the control component of FIG. 1 can be configured to provide a user input functionality.

FIG. 3 depicts an example system that includes an audio device and a portable device.

DETAILED DESCRIPTION OF SOME EMBODIMENTS

Figure 4:
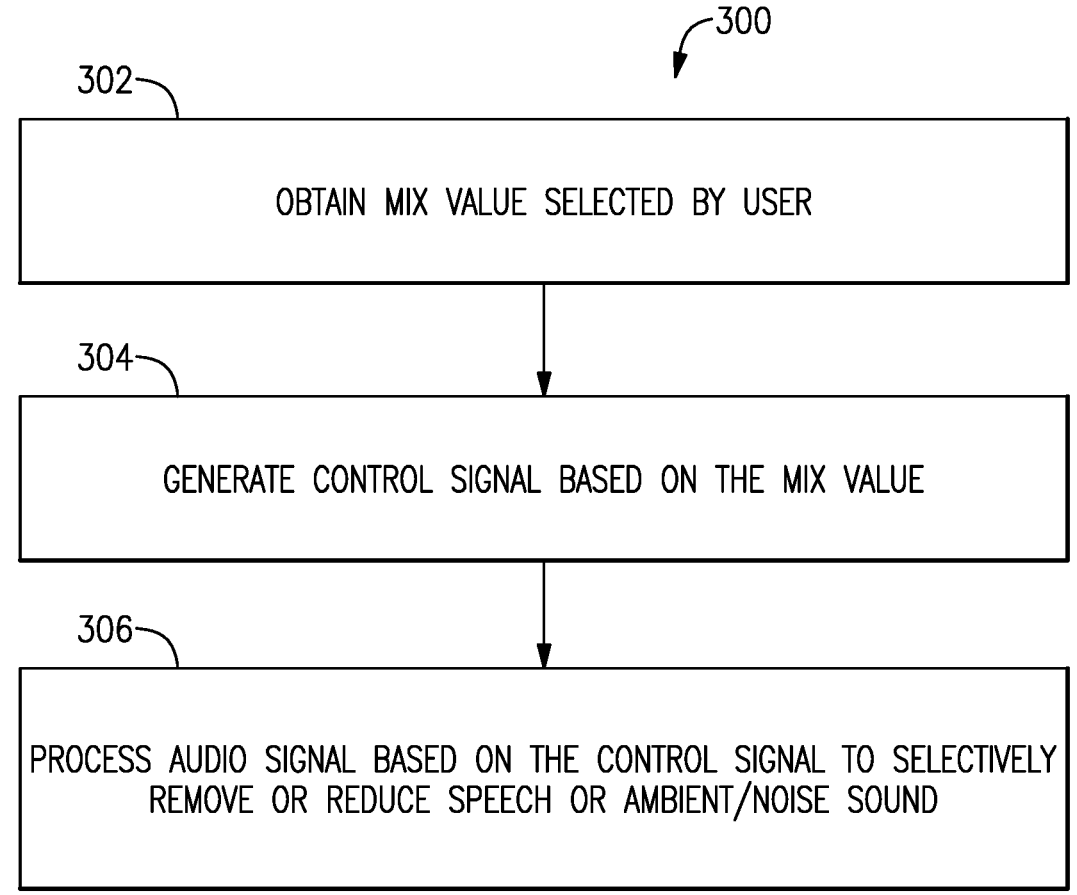
FIG. 4 shows a process that can be implemented to provide a sound output as described in reference to FIGS. 1 to 3.

The headings provided herein, if any, are for convenience only and do not necessarily affect the scope or meaning of the claimed invention.

In many noise suppression applications, noise suppression is achieved by either providing a binary switch for turning noise suppression on or off, or providing a functionality that controls the amount of noise reduction. For the latter implementation, an output of noise reduction control can be represented as $$Output=(1-mix)*unprocessed+mix*processed, \quad (1)$$

where processed=$f$(unprocessed) with $f$ representing a noise suppression function (e.g., an artificial intelligence (AI) noise suppression function), and mix representing a mixture quantity. For mix=0, one can see that Equation 1 becomes output=unprocessed content that includes speech and noise. For mix=1, one can see that Equation 1 becomes output=processed content having just the speech.

Based on the foregoing example, one can see that the unprocessed content has both noise and speech, and the process content only has speech. Thus, it is possible to create an "ambient" or "noise" content with speech being removed, by subtracting the processed content from the unprocessed content. In some applications, such a functionality can be useful or desirable if a user wants to block out nearby human speech and listen to environmental sound (e.g., waterfall, birds chirping, etc.).

Described herein are examples related to circuits, devices, systems, user interfaces and/or methods that can provide a user with an option for selectively removing speech in an output being provided to the user through an audio device.

Although such examples are described in the context of speech being removed and ambient noise being retained in a selective manner, it will be understood that one or more features of the present disclosure can also be implemented in more generalized manners. For example, if sound content being provided to a user can be grouped into first and second groups, then removal and retaining of such groups of sound content can be achieved in a selected manner as described herein.

It is noted that in the foregoing example involving speech and ambient noise, the speech can be considered to be in a first group of sound content, and the ambient noise can be considered to be in a second group of sound content. Alternatively, the ambient noise can be considered to be in a first group of sound content, the speech can be considered to be in a second group of sound content.

FIG. 1 depicts a block diagram of an audio device 100 having a control component 102, an audio processor component 104 and a speaker component 106. In some embodiments, the audio processor component 104 can be configured to convert an electrical signal (e.g., analog, digital or some combination thereof) into an audio signal that drives the speaker 106. In some embodiments, the control component 102 can be configured to control the operation of the audio processor component 104. In some embodiments, such control functionality can include, or be associated with, selective filtering of first and second groups of sound content, such as speech and ambient noise.

In some embodiments, the audio device 100 of FIG. 1 can be, for example, a headphone. Such a headphone having one or more features as described herein can be a stand-alone device, a part of a system with a separate portable device, or some combination thereof. If implemented in a system with a separate portable device, the audio device 100 can be in communication with the separate portable device (e.g., a smartphone) through one or more wires, wirelessly, or some combination thereof.

FIG. 2 shows that in some embodiments, the control component 102 of FIG. 1 can be configured to provide a user input functionality. For example, a selection knob 112 can be provided to allow a user to select a mixture value within a range between a first state having ambient noise but no speech and a second state having speech but no ambient noise. In between such states, an unprocessed state can include both speech and ambient noise.

In the example of FIG. 2, the selection knob 112 can be implemented as, for example, a hardware knob, a graphic user interface knob responsive to touch, or some combination thereof. In some embodiments, the control component 102 can be implemented on the audio device itself, on a separate portable device, or some combination thereof.

FIG. 3 depicts an example system 200 that includes an audio device 100 and a portable device 202. In some embodiments, the audio device 100 and the portable device 202 can be configured to support a communication link 212 therebetween. Such a communication link can be one way (e.g., from the portable device 202 to the audio device 100), or both ways therebetween.

In some embodiments, the communication link 212 can be achieved through one or more wires, wirelessly, or some combination thereof. Such a communication link can be utilized to provide a transfer of a user input provided through a graphic user interface 210 of the portable device 202. Such a user input can include a selected mixture value similar to the example of FIG. 2 (e.g., a mixture value within a range between a first state having ambient noise but no speech and a second state having speech but no ambient noise, with an unprocessed state therebetween and including both speech and ambient noise.

In the example of FIG. 3, a control component 102 can be implemented to receive a signal associated with the foregoing user input and generate one or more control signals to operate an audio processor 104 in accordance with the selected mixture value. Based on such operation of the audio processor 104, sound provided to a user through a speaker 106 can be in one of a number of states between the first and second states.

FIG. 4 shows a process 300 that can be implemented to provide a sound output as described in reference to FIGS. 1 to 3. In a process block 302, a mix value selected by a user can be obtained. In a process block 304, a control signal can be generated based on the selected mix value. In a process block 306, an audio signal can be processed based on the control signal to selectively remove or reduce speech or ambient noise sound.

In some embodiments, the range between the first and second states in each of the examples of FIGS. 2 and 3 can be configured to provide a mixture value (mix) in an interval $[-M_{limit}, +M_{limit}]$, with the unprocessed state corresponding to a mixture value of zero (0). Thus, the first state having ambient noise but no speech corresponds to a mixture value of $-M_{limit}$, or mix$=-M_{limit}$, and the second state having speech but no ambient noise corresponds to a mixture value of $+M_{limit}$, or mix$=+M_{limit}$. In between such states, a mixture value between $-M_{limit}$ and $+M_{limit}$ can correspond to a respective combination of ambient noise and speech.

In some embodiments, the foregoing mixture value (mix) can have a plurality of values between the first state (ambient noise only) and the unprocessed state, and a plurality of values between the unprocessed state and the second state (speech only). In some embodiments, the number of mixture values between the first state and the unprocessed state may or may not be the same as the number of mixture values between the unprocessed state and the second state.

In some embodiments, the foregoing mixture value (mix) can have a continuous or substantially continuous value between the first state (ambient noise only) and the second state (speech only).

In some embodiments, an output of sound selection control (e.g., by the control component 102 in FIGS. 1 to 3) can be represented as $$\text{Output}=(M_{limit}-\text{abs(mix)})^*\text{unprocessed}+\text{abs(mix)}^*\text{processed} \qquad (2)$$

where processed$=f$(unprocessed) with $f$ representing a sound suppression function (e.g., an artificial intelligence (AI) sound suppression function), and mix representing a selected mixture value in an interval $[-M_{limit}, +M_{limit}]$. For mix$=0$, one can see that Equation 2 becomes output$=M_{limit}^*$unprocessed that includes speech and noise.

In a more specific example, $M_{limit}$ it can have a value of 1, such that a selected mixture value is in an interval $[-1, +1]$, and Equation 2 becomes $$\text{Output}=(1-\text{abs(mix)})^*\text{unprocessed}+\text{abs(mix)}^*\text{processed} \qquad (3)$$

In the context of the example of Equation 3, it is noted that the selected mixture value (mix) of $-1$ corresponds to a first state with ambient noise only, and the output of Equation 3 becomes Output$=$processed$=f$(unprocessed); the selected mixture value (mix) of 0 corresponds to an unprocessed state with ambient noise and speech, and the output of Equation 3 becomes Output$=$unprocessed; and the selected mixture value (mix) of $+1$ corresponds to a second state with speech only, and the output of Equation 3 becomes Output$=$processed$=f$(unprocessed).

It is also noted that when the mixture value is in a range 0<mix≤1, the output of Equation 3 can be calculated with processed$=f$(unprocessed), with the mix$=1$ being a special case discussed above. When the mixture value is in a range $-1$≤mix<0, the output of Equation 3 can be calculated with processed$=$unprocessed$-f$(unprocessed), with the mix$=-1$ being a special case discussed above.

Figure 5:
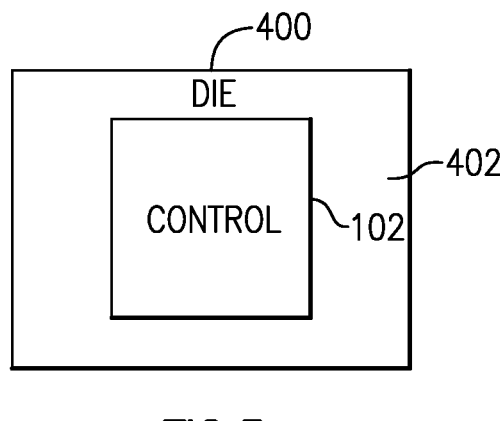
FIG. 5 shows that in some embodiments, a semiconductor die having a substrate can include a control circuit having one or more features as described herein.
Figure 6:
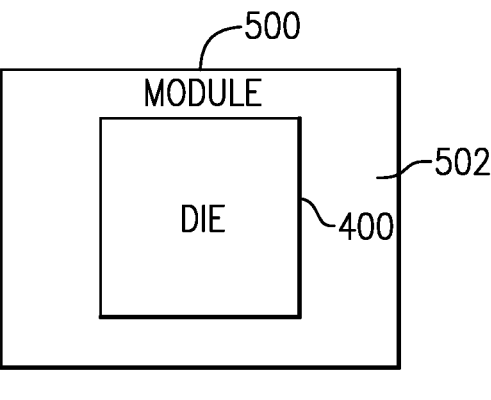
FIG. 6 shows that in some embodiments, a module having a packaging substrate can include a control circuit having one or more features as described herein.
Figure 7:
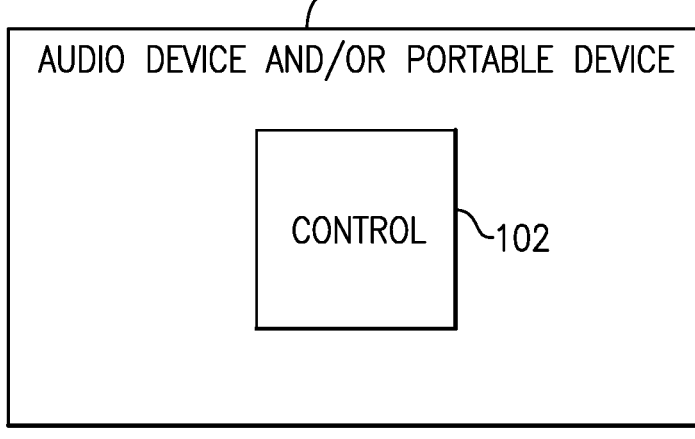
FIG. 7 shows that in some embodiments, an audio device and/or a portable device can include a control functionality having one or more features as described herein.

FIGS. 5 to 7 show examples of various products where one or more features of the present disclosure can be implemented. For example, FIG. 5 shows that in some embodiments, a semiconductor die 400 having a substrate 402 can include a control circuit 102 having one or more features as described herein. In some embodiments, the die 400 can also include a corresponding audio processor (e.g., 104 in FIGS. 1 and 3).

In another example, FIG. 6 shows that in some embodiments, a module 500 having a packaging substrate 502 can include a control circuit having one or more features as described herein. Such a control circuit can be implemented on a die 400, similar to the die 400 of FIG. 5, and the die 400 can be mounted on the packaging substrate 502.

In yet another example, FIG. 7 shows that in some embodiments, an audio device (e.g., a headphone) and/or a portable device (e.g., a wireless device such as a smartphone), collectively indicated as 600, can include a control functionality 102 having one or more features as described herein.

Figure 8:
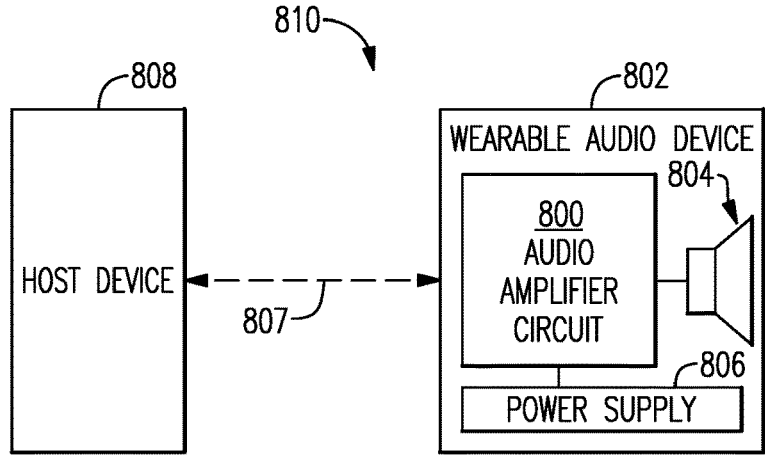
FIG. 8 depicts a system where one or more features of the present disclosure can be implemented.

FIG. 8 depicts a system 810 where one or more features of the present disclosure can be implemented. In some embodiments, such a system can include a wearable audio device 802 in communication with a host device 808. Such communication, depicted as 807, can be supported by, for example, a wireless link such as a short-range wireless link in accordance with a common industry standard, a standard specific for the system 810, or some combination thereof. In some embodiments, the wireless link 807 includes digital format of information being transferred from one device to the other (e.g., from the host device 808 to the wearable audio device 802).

In FIG. 8, the wearable device 802 is shown to include an audio amplifier circuit 800 that provides an electrical audio signal to a speaker 804 based on a digital signal received from the host device 808. Such an electrical audio signal can drive the speaker 804 and generate sound representative of a content provided in the digital signal, for a user wearing the wearable device 802.

In some embodiments, one or more features of selective filtering of speech and noise as described herein can be implemented to operate independently from the foregoing digital signal received from the host device, or in conjunction with the digital signal received from the host device. In some embodiments, the wearable device 802 can include one or more audio input devices such as microphones to sense sound content present at or about the wearable device to thereby allow selective filtering of such sound content. In some embodiments, at least some of an interface for configuring such selective filtering can be implemented in the host device 808.

In FIG. 8, the wearable device 802 can be a wireless device; and thus typically includes its own power supply 806 including a battery. Such a power supply can be configured to provide electrical power for the audio device 802, including power for operation of the audio amplifier circuit 800.

In some embodiments, the host device 808 can be a portable wireless device such as, for example, a smartphone, a tablet, an audio player, etc. It will be understood that such a portable wireless device may or may not include phone functionality such as cellular functionality. In such an example context of a portable wireless device being a host device, FIG. 9 shows a more specific example of the wearable audio device 802 of FIG. 9.

Figure 9:
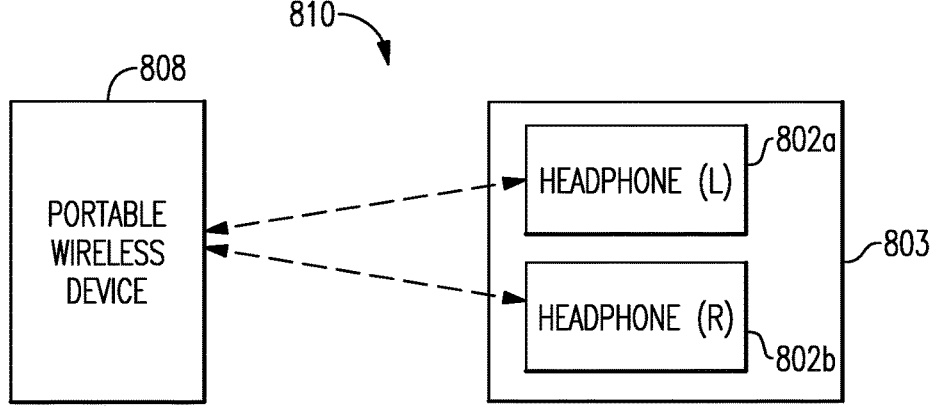
FIG. 9 shows a system that can be a more specific example of the system of FIG. 8.

FIG. 9 shows that in some embodiments, the wearable audio device 802 of FIG. 8 can be implemented as part of a headphone 803 configured to be worn on the head of a user, such that the audio device (802a or 802b) is positioned on or over a corresponding ear of the user. In the example of FIG. 9, a pair of audio devices (802a and 802b) can be provided—one for each of the two ears of the user. In some embodiments, each audio device (802a or 802b) can include its own components (e.g., audio amplifier circuit, speaker and power supply) described above in reference to FIG. 8. In some embodiments, one audio device (802a or 802b) can include an audio amplifier circuit that provides outputs for the speakers of both audio devices. In some embodiments, the pair of audio devices 802a, 802b of the headphone 803 can be operated to provide, for example, stereo functionality for left (L) and right (R) ears.

Figure 10:
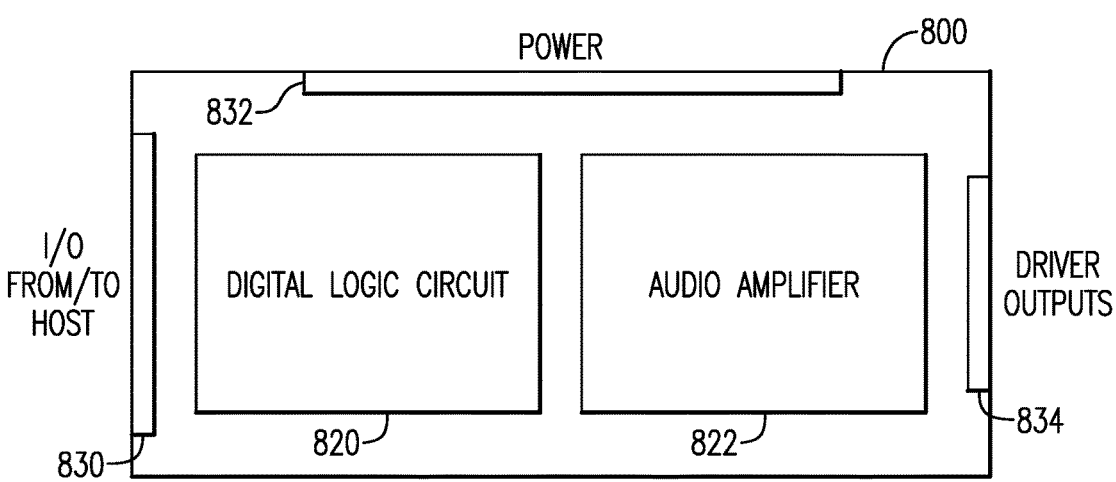
FIG. 10 shows an example of an audio amplifier circuit that can provide one or more control functionalities as described herein.

FIG. 10 shows that in some embodiments, the audio amplifier circuit 800 of FIG. 8 can include a number of functional blocks. More particularly, in FIG. 10, an audio amplifier circuit 800 is shown to include a digital logic circuit block 820 and an amplifier block 822. In some embodiments, one or more features associated with selective filtering of speech and noise as described herein can be implemented in the digital logic circuit block 820.

In FIG. 10, the audio amplifier circuit 800 is shown to further include various interfaces to allow the audio amplifier circuit 800 to interact with other devices external to the audio amplifier circuit 800. For example, an interface indicated as 830 can be configured to support input/output (I/O) functionality with respect to a host device (e.g., 808 in FIG. 8). An interface indicated as 834 can be configured to support providing of electrical audio signals to a speaker (e.g., 804 in FIG. 8). An interface indicated as 832 can be configured to support providing of electrical power to various parts of the audio amplifier circuit 800.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for controlling an audio system, the method comprising:

obtaining a mixture value from a user, the mixture value having a value in a range from a first value, $-M_{limit}$, for a first state to a second value, $+M_{limit}$, for a second state, the first state corresponding to a desired sound having substantially all of a first content and substantially nil amount of a second content, the second state corresponding to a desired sound having substantially nil amount of the first content and substantially all of the second content, the mixture value being a selected one among multiple values in the range, the multiple values including an unprocessed mixture value for an unprocessed state corresponding to a desired sound having unprocessed first and second contents, the first content including an ambient noise content, and the second content including a speech content;

generating a control output signal based on the selected mixture value, the control output signal being represented as $Output=(M_{limit}-abs(mix))*unprocessed+abs(mix)*processed$, where $processed=f(unprocessed)$ with f representing a sound suppression function and mix representing the selected mixture value; and processing an audio signal based on the control output signal to generate a sound having the first content and/or the second content according to the selected mixture value.

2. The method of claim 1 wherein the sound suppression function includes an artificial intelligence sound suppression function.

3. The method of claim 1 wherein the quantity $M_{limit}$ has a value of 1, such that the control output signal is represented as $Output=(1-abs(mix))*unprocessed+abs(mix)*processed$, where $processed=f(unprocessed)$.

4. The method of claim 1 wherein the range is selected such that the unprocessed mixture value is approximately at middle of the range.

5. The method of claim 1 wherein the obtaining of the mixture value includes obtaining an input through a device that generates the sound.

6. The method of claim 5 wherein the sound-generating device is a headphone.

7. The method of claim 1 wherein the obtaining of the mixture value includes obtaining an input through a portable device in communication with a device that generates the sound.

8. The method of claim 7 wherein the communication between the portable device and the sound-generating device includes a wireless communication.

9. The method of claim 7 wherein the portable device is a smartphone and the sound-generating device is a headphone.

10. The method of claim 7 wherein the obtaining of the input through the portable device includes providing a graphic user interface that allows the user to select the mixture value.

11. The method of claim 1 wherein the multiple values in the range are discrete values.

12. The method of claim 1 wherein the multiple values in the range are parts of continuous or approximately continuous values in the range.

13. An audio device comprising:

a speaker for providing an output sound to a user;

an audio processor configured to generate the output sound based on an audio signal; and a controller configured to obtain a mixture value in a range from a first value, $-M_{limit}$, for a first state to a second value, $+M_{limit}$, for a second state, the first state corresponding to a desired sound having substantially all of a first content and substantially nil amount of a second content, the second state corresponding to a desired sound having substantially nil amount of the first content and substantially all of the second content, the mixture value being a selected one among multiple values in the range, the multiple values including an unprocessed mixture value for an unprocessed state corresponding to a desired sound having unprocessed first and second contents, the first content including an ambient noise content, and the second content including a speech content, the controller further configured to generate a control output signal based on the selected mixture value, the control output signal being represented as Output=$(M_{limit}-abs(mix))$*unprocessed+abs (mix)*processed, where processed=f(unprocessed) with f representing a sound suppression function and mix representing the selected mixture value, such that the audio processor processes the audio signal based on the control output signal to generate the output sound with the first content and/or the second content according to the selected mixture value.

14. The audio device of claim 13 wherein the audio device is a headphone.

15. A system comprising:

an audio device including a speaker for providing an output sound to a user, an audio processor configured to generate the output sound based on an audio signal, and a controller configured to obtain a mixture value in a range from a first value, $-M_{limit}$, for a first state to a second value, $+M_{limit}$, for a second state, the first state corresponding to a desired sound having substantially all of a first content and substantially nil amount of a second content, the second state corresponding to a desired sound having substantially nil amount of the first content and substantially all of the second content, the mixture value being a selected one among multiple values in the range, the multiple values including an unprocessed mixture value for an unprocessed state corresponding to a desired sound having unprocessed first and second contents, the first content including an ambient noise content, and the second content including a speech content, the controller further configured to generate a control output signal based on the selected mixture value, the control output signal being represented as Output=$(M_{limit}-abs(mix))$*unprocessed+abs (mix)*processed, where processed=f (unprocessed) with f representing a sound suppression function and mix representing the selected mixture value, such that the audio processor processes the audio signal based on the control output signal to generate the output sound with the first content and/or the second content according to the selected mixture value; and a portable device configured to communicate with the audio device, the portable device including an application that allows the user to select the mixture value.

16. The system of claim 15 wherein the portable device is a smartphone and the audio device is a headphone.

17. The system of claim 15 wherein the application on the portable device includes a graphic user interface having a display configured to allow the user to select the mixture value.

\* \* \* \* \*